(No Model.) 5 Sheets—Sheet 1.

A. M. DONALLY.
BOTTLING APPARATUS.

No. 467,086. Patented Jan. 12, 1892.

WITNESSES: Chas. Nida, C. Sedgwick

INVENTOR: A. M. Donally
BY Munn & Co.
ATTORNEYS (No Model.) 5 Sheets—Sheet 3.
A. M. DONALLY.
BOTTLING APPARATUS.
No. 467,086. Patented Jan. 12, 1892.
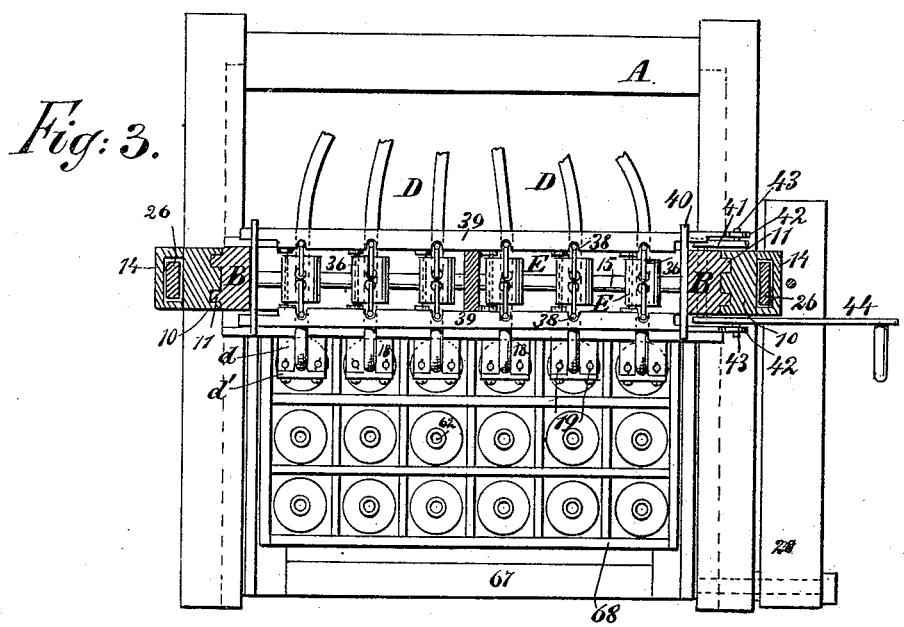
Fig. 3.
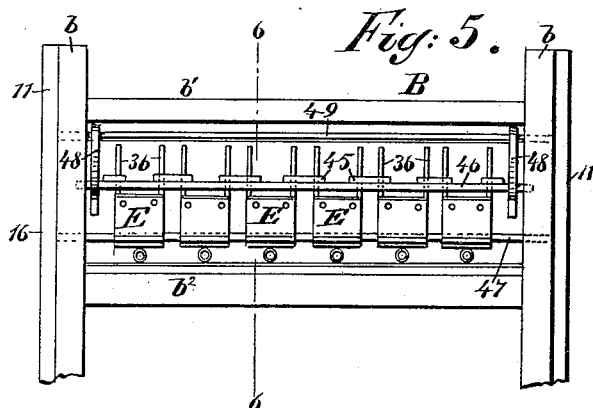
Fig. 5.
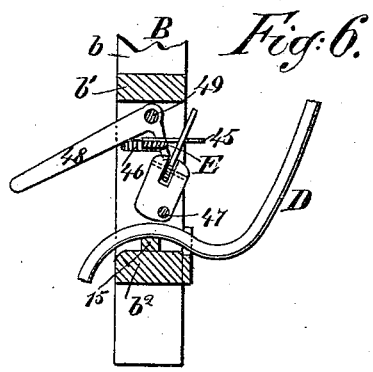
Fig. 6.
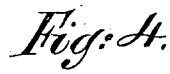
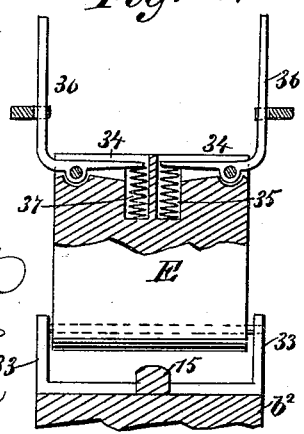
Fig. 4.
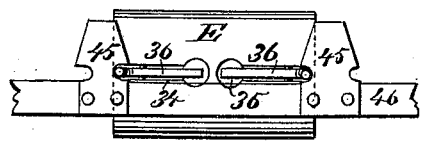
Fig. 7.
WITNESSES:
Chas. Nida.
C. Sedgwick.
INVENTOR:
A. M. Donally
BY
Munn & Co.
ATTORNEYS
THE NORRIS PETERS CO., PHOTO-LITHO., WASHINGTON, D. C.

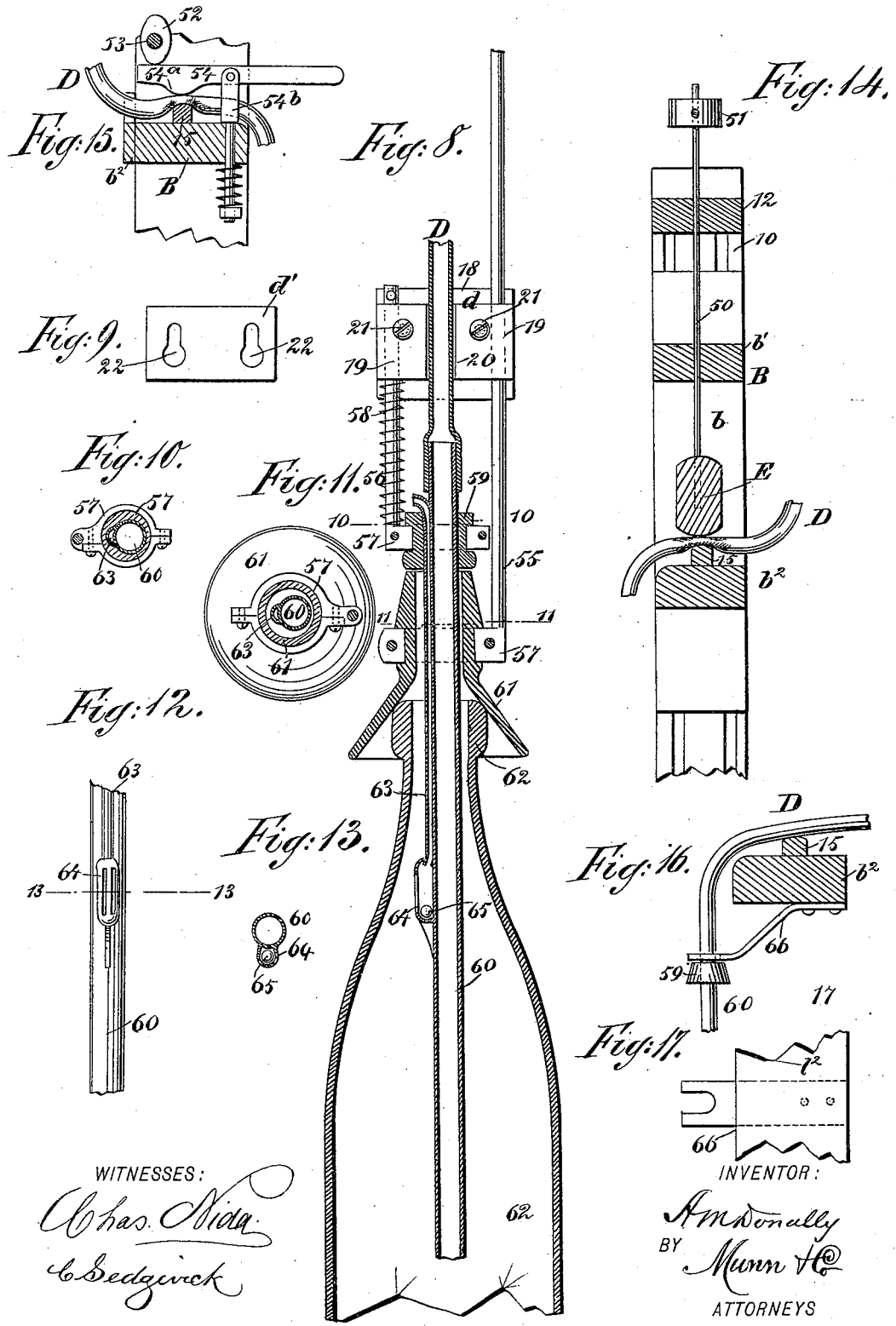

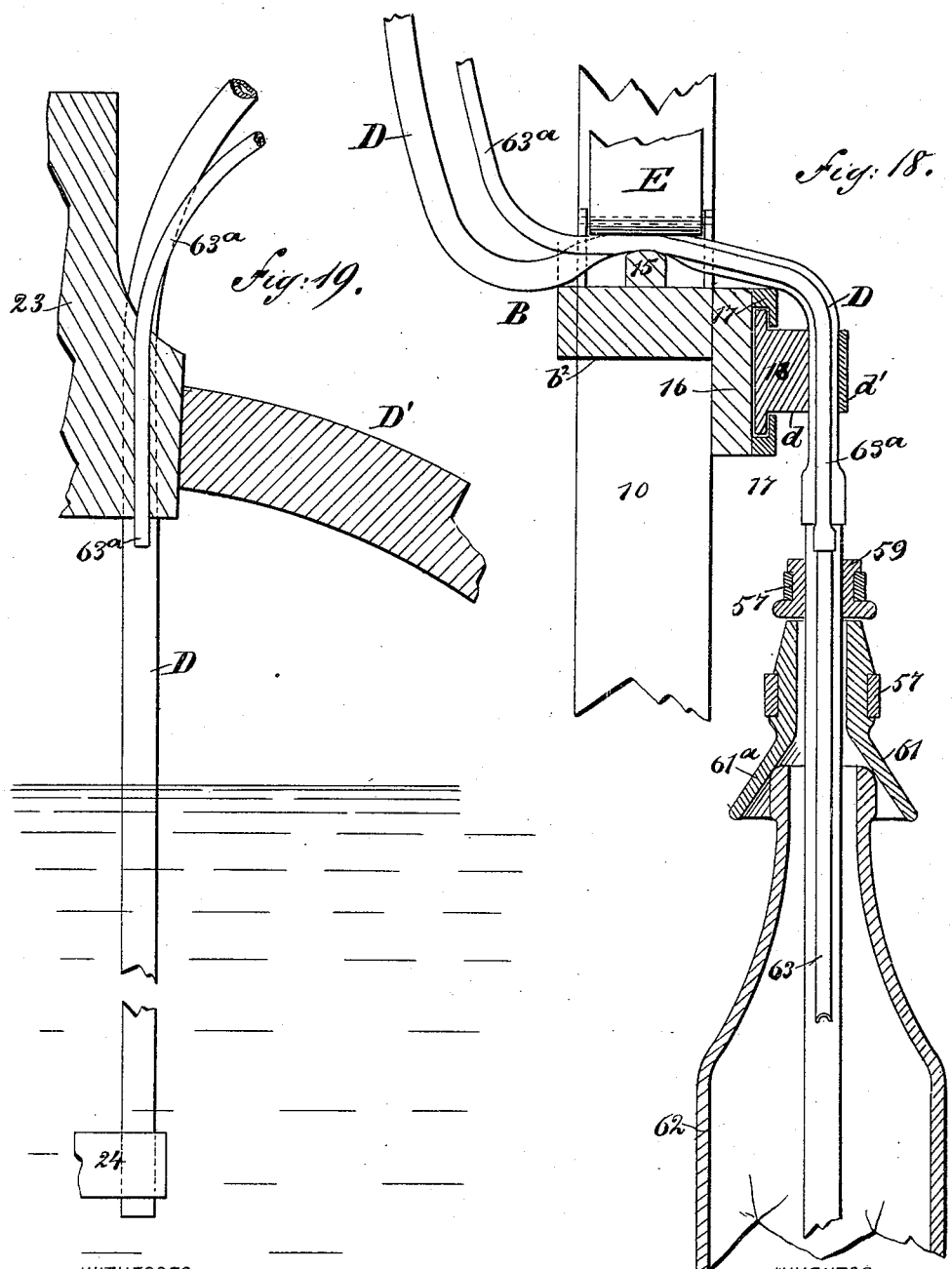

UNITED STATES PATENT OFFICE.

AMALIA M. DONALLY, OF NEW YORK, N. Y.

BOTTLING APPARATUS.

SPECIFICATION forming part of Letters Patent No. 467,086, dated January 12, 1892.

Application filed March 17, 1891. Serial No. 385,375. (No model.)

*To all whom it may concern:*

Be it known that I, AMALIA M. DONALLY, of New York city, in the county and State of New York, have invented a new and useful Improvement in Bottling Apparatus, of which the following is a full, clear, and exact description.

My invention relates to improvements in bottle-filling apparatus, especially to the construction of an apparatus adapted for bottling beer and other gaseous liquids, and has for its object to provide an effective machine, in connection with which flexible filling-tubes may be employed, and to provide a means whereby the machine may be effectually and expeditiously manipulated by a single attendant; and a further object of the invention is to so construct the machine that a series of bottles of irregular sizes may be filled as readily as a series of bottles of regular sizes, and also to provide a means whereby the supply of liquid may be cut off from any one or from the entire number of bottles being filled at the option of the operator.
The invention consists in the novel construction and combination of the several parts, as will be hereinafter fully set forth, and pointed out in the claims.

Reference is to be had to the accompanying drawings, forming a part of this specification, in which similar figures and letters of reference indicate corresponding parts in all the views.

Figure 1:
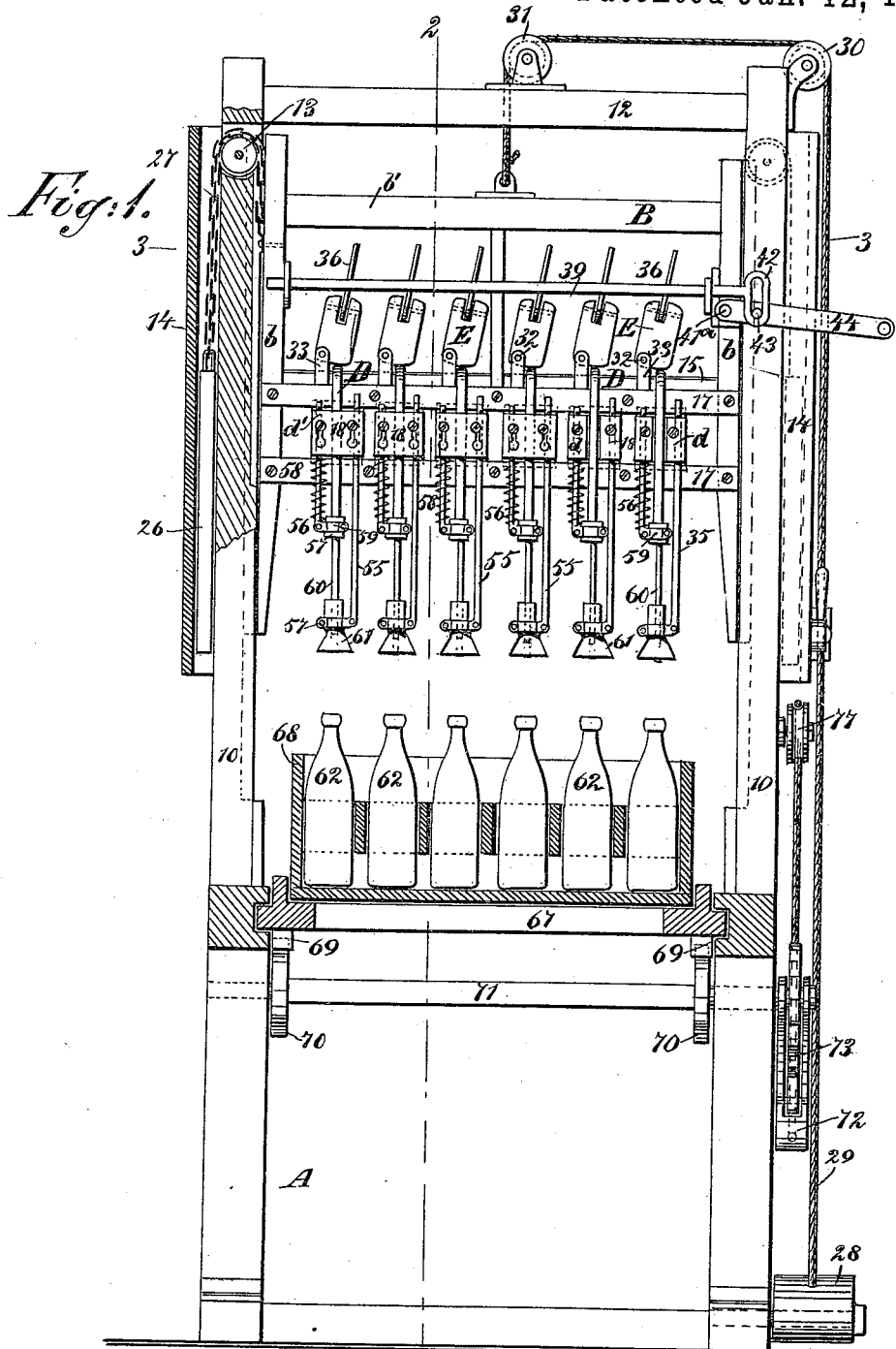
Figure 2:
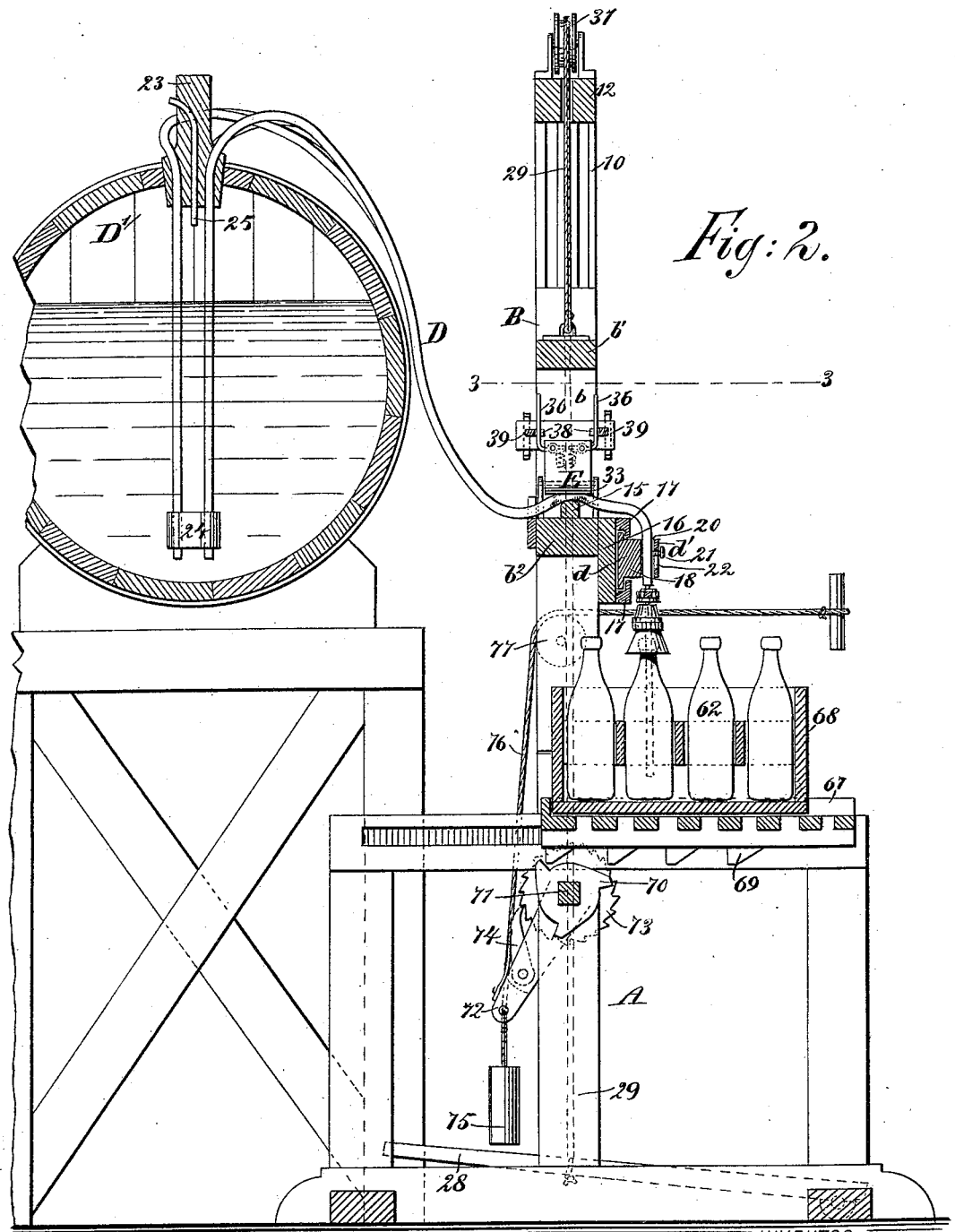

Figure 1 is a front elevation of the machine, a portion of one standard and the table carrying the box of bottles to be filled being in section. Fig. 2 is a central vertical section taken on the line 2 2 of Fig. 1. Fig. 3 is a horizontal section taken, practically, on the line 3 3 of Fig. 2. Fig. 4 is a detail view of one of the valve or pressure blocks, partially in side elevation and partially in section, and also a sectional view of the anvil-block over which it is located. Fig. 5 is a partial side elevation of a portion of the apparatus, illustrating a modification in the construction and location of the valves or pressure-blocks. Fig. 6 is a transverse section on the line 6 6 of Fig. 5. Fig. 7 is a plan view of one of the modified forms of blocks or valves and adjacent rack-bar. Fig. 8 is an enlarged vertical section through one of the filling-tubes, its cap, and cut-off, and also a vertical section through the bottle, illustrating the position of the tube, cap, and cut-off while the bottle is being filled. Fig. 9 is a detail view of a plate adapted to lock a flexible filling-tube in position. Fig. 10 is a transverse section taken on the line 10 10 of Fig. 8. Fig. 11 is a similar section taken on the line 11 11 of Fig. 8. Fig. 12 is a side elevation of a portion of the rigid filling-tube adapted to enter the bottle, and Fig. 13 is a transverse section on the line 13 13 in Fig. 12. Fig. 14 is a partial vertical section through the machine, illustrating a further modified form of valve or pressure block. Fig. 15 represents a further modification of the valve or pressure block. Fig. 16 is a detail view illustrating a means for compressing the cut-off, the said means being adapted as a substitute for that shown in Fig. 1; and Fig. 17 is a plan view of the device illustrated in Fig. 16. Fig. 18 is a partial vertical section illustrating the preferred form of vent-tube, and Fig. 19 is virtually a continuation of Fig. 18 and illustrates the manner in which the vent-tube is connected with the cask.

The frame of the machine consists of a base-section A, upon which, at or near the center, standards 10 are secured, one at each side, the said standards being provided in their inner faces with channels adapted to receive tongues 11, formed at the sides of a movable frame B, which frame is adapted to slide in the fixed frame above the base thereof. The standards of the fixed frame are connected at their upper ends by a cross beam or bar 12, and said standards near their upper ends are provided with recesses, in which pulleys 13 are journaled, and also with vertical pockets 14, formed upon their outer faces.

The movable frame B ordinarily comprises two side pieces $b$, united by an upper cross-bar $b'$ and a lower cross-bar $b^2$, the latter being provided with a rib or block 15 upon its upper face, extending longitudinally from end to end, the said block constituting an anvil-block. A board or plate 16 is secured to the front face of the lower beam $b^2$ of the sliding frame, and upon the board or plate at top and bottom a slideway 17 is formed, in which slideways a number of head-blocks 18 are fitted. The head-blocks are arranged at predetermined intervals apart and consist of a body-section $d$ and a cover-section $d'$. The body-sections are provided with vertical apertures 19, extending through from top to bottom, one of said apertures being located near each end, as shown in dotted lines in Fig. 8. The body-section is further provided with a vertical central recess 20, produced in its front face, and two screws 21 or their equivalents located one at each side of the recess, as is also best shown in Fig. 8. The cover-section $d'$ has produced therein two key-hole slots 22, which receive the screws 21 when the two sections are united. The cover-plate $d'$ closes the recess 20 and prevents any article placed therein from dropping out laterally. It is evident that whatever articles are placed in the recesses 20 of the head-blocks may be readily removed by sliding up the cover-plates until the enlarged portions of their slots 22 receive the heads of the screws 21.

The recesses 20 of the head-blocks are preferably adapted for the reception of the lower ends of a series of flexible tubes D, which tubes pass rearward over the anvil-block 15. The tubes at their rear ends are passed through apertures formed in a bung 23, which bung is adapted to be driven into the bung-hole of the cask D' to be emptied. The flexible tubes extend some distance below the bottom of the bung, and when the bung is in position said tubes reach practically to the lower side of the cask, as shown in Fig. 2. The lower ends of the tube are connected by united rings and apertured block 24 or equivalent thereof.

The bung is constructed with an upwardly-extending shank, and a blow-tube 25 is located in the bung, extending through its under side and also through and beyond the shank-section, as is likewise shown in Fig. 2. The object of the tube 25 is to permit the flow of liquid, which is accomplished by forcing air into the cask through the tube, which, pressing upon the liquid, forces the latter upward into the flexible tubes. When siphonage is established, the supply of air is cut off.

The frame B is to a great extent counterbalanced by means of weights 26, adapted to slide in the pockets 14 of the fixed frame, the said weights being attached to chains 27, which pass over the friction-pulleys 13, and are connected with the side pieces of the movable frame at or near its upper end. The movable frame is elevated, preferably through the medium of a foot-treadle 28, pivoted at one side of the base A, which treadle has secured thereto a rope or chain 29, carried upward over friction-pulleys 30 and 31, located at one side and at the top of the fixed frame, downward through an aperture in the upper cross-beam of the fixed frame to a connection with the upper portion of the sliding frame, preferably at the center of the latter.

A series of valve or pressure blocks E is arranged over the anvil-block, and preferably the pressure-blocks are pivoted at their lower ends by pins 32, which pins are passed through the blocks at one side of their centers and through ears 33, located upon the main beam $b^2$ of the sliding frame. The preferred form of valve or pressure block E is illustrated in Fig. 4, in which it will be observed that the lower surface is somewhat cylindrical, and the upper surface is provided with channels 34, extending from the ends and connecting with apertures 35, located at the center of the block, which apertures are preferably two in number. In the recesses 34 the horizontal members of angled levers 36 are pivoted, and the inner extremities of the horizontal members of said levers extend over and bear upon springs 37, located in the apertures 35. The vertical members of the angled levers extend upward and enter notches or recesses 38, produced in the inner edges of two parallel bars 39, which bars are loosely connected with the side pieces of the sliding frame B at one end, one of the bars being located at each side of said frame, as shown in Fig. 3, and the said bars at their opposite ends are held to slide in bars 40, and one end of each bar is provided with a loop or eye 42. A shaft $41^a$, journaled in one of the side pieces $b$ of the frame B, is provided at one end with a handle-lever 44 and at the other end with a short arm 41, which lever and arm carry pins 43, which enter the loops 42 of the bars 39.

The number of valve or pressure blocks employed corresponds to the number of flexible tubes D, and one of the valve or pressure blocks is located over each of the tubes. When the lever 44 is carried upward, the valve or pressure blocks E are carried out of engagement with the flexible tubes, as the blocks are canted away from the tubes and made to incline in the direction of their pivotal sides. This is accomplished by sliding the rack-bars 39, connected with the lever.

When the lever is in the downward position, the rack-bars are drawn forward, as shown in Fig. 1, and the valve or pressure blocks are inclined over the tubes D and bear down thereon, thus preventing the flow of liquid through the tubes. Any one of the tubes may be relieved from pressure by drawing the vertical members of the angled levers connected with the block above the tube in direction of each other, thus freeing said members from engagement with the rack-bars, and when the lever 44 is manipulated each valve or pressure block engaging with the rack-bar is operated upon simultaneously.

In Figs. 5, 6, and 7 I have illustrated a modification in the construction and location of the valve or pressure blocks. In the preferred form illustrated in Fig. 1 the ends of the blocks face the front and rear of the apparatus; but in the construction shown in Fig. 5 the sides of the block face in those directions. The blocks are of the same construction heretofore described; but the angled levers 36 engage with notched extension-plates 45, projected from a single rack-bar 46, said bar being located above the blocks, as illustrated in Fig. 6. The valve-blocks are pivoted also at one side of their center upon a continuous rod 47, instead of having independent pivots. The rack-bar is operated through the medium of levers 48, pivoted upon a rod 49, fast in the sides of the sliding frame, the said levers being angled levers, and one of the members of the levers engages with the forward side edge of the rack-bar. The rack-bar is adapted for lateral movement in the direction of the front and rear of the frame, whereby the valve or pressure blocks may be made to compress the flexible tubes or be carried out of engagement therewith, as desired. Each of the valve or pressure blocks may be manipulated independently through the medium of their spring-levers 36.

In Fig. 14 the valve or pressure blocks E are shown solid and attached to one end of rods 50, which rods pass upward through the cross-bar $b'$ of the sliding frame and likewise the cross-bar 12 of the fixed frame, and at the upper end of each of the rods a head 51 is secured. In the operation of this form of the apparatus the blocks will exert pressure upon the flexible tubes until the heads 51 are brought in engagement with and rest upon the upper cross-bar of the fixed frame, and this contact will occur when the movable frame has been carried a sufficient distance downward to carry the tubes out of the reach of the valve-blocks, which happens when the apparatus is in position to fill bottles.

A further modification is illustrated in Fig. 15, in which a series of preferably oval blocks or buttons 52 is fast upon a shaft 53, located some distance above the anvil-block, the shaft being journaled in the movable frame. The buttons 52 bear down upon one end of a lever 54, said lever being provided with an extension $54^a$ upon one face, located immediately over the anvil-block. The lever is fulcrumed upon the upper end of a spring-pressed pin $54^b$, which is free to move vertically in the lower cross-bar $b^2$ of the sliding frame. When the buttons 52 are in the position shown in Fig. 15, the extension-face of the lever is pressed downward upon the flexible tube, preventing liquid from passing through it, and when the buttons are disengaged from the levers 54 the spring connected with the fulcrum-pin of said levers forces them out of engagement with the tube. Any particular tube may be freed from pressure by pressing down the end of the lever opposite that against which the button 52 has bearing.

In connection with the head-blocks 18 two movable brackets 55 and 56 are employed. Each of the brackets consists of a rod having attached at its lower end a clamping-collar 57. The rods pass upward through and have free movement in the apertures 19 of the head-blocks, as shown in Figs. 1 and 8. The bracket 56 is of less length than the bracket 55, and the former bracket is provided with a spring 58, coiled around its rod-section, bearing against the clamping-collar at one end and against the under surface of the head-block at its opposite end. The clamp-collar of the bracket 56 surrounds a stopper 59 in the shape of a sleeve, of rubber or similar material, which stopper is located upon a metal tube 60, one of which tubes is attached to each of the flexible tubes D; but the flexible tubes may be continuous and the collar may be attached directly to said tubes. The metal tubes pass freely through funnel-caps 61, preferably made of rubber or a like material, and the funnel-caps are clamped at or near their central portions to the collar-sections 57 of the brackets 55. The caps 61 are in the shape of an inverted funnel, and the larger lower end of the funnel is adapted to pass over and surround the mouths of the bottles 62 to be filled. Each of the metal filling-tubes 60 are provided at one side with an air-vent tube 63, which vent-tubes extend upward from a point between the ends of the filling-tube out through the stoppers 59. At the lower ends of the vent-tubes 63 an open cage 64 is constructed, in which cages balls 65 or other forms of float-valves are located, the said balls being free to move vertically. As a substitute for the spring-controlled bracket 56, a spring-arm 66 may be secured to the under face of the lower beam $b^2$ of the sliding frame. The lower end of the spring is bifurcated and surrounds a tube 60 immediately above the stopper 59. When the spring-arm 66 is employed, the stopper 59 is preferably located at the junction of a metal tube with its flexible tube.

A platform 67 is held to slide in suitable ways produced in opposite side faces of the base-section A of the apparatus. The platform 67 is adapted to support the box or case 68, in which the bottles 62 to be filled are placed. The platform upon its under surface at opposite sides is provided with a series of teeth 69, forming rack-faces, said rack-faces being engaged by spur-wheels 70, located upon a shaft 71, journaled transversely in the base. The shaft 71 is rotated through the medium of a lever 72, secured upon the outer end of the shaft, which lever is bifurcated, and between the members of the lever a ratchet-wheel 73 is fast upon the shaft and engaged by a dog 74, which dog is pivoted upon the lever. The lever 72 is provided at its lower or free end with an attached weight 75, and a rope, cord, or chain 76 is attached to the free end of the lever and passed upward over a friction-pulley 77, located at one side of the apparatus, and the said rope or chain is carried forward to the front of the apparatus, whereby it may be grasped by the operator.

In operation, before the filling is commenced the treadle 28 is pressed downward and the frame B is carried upward. The platform 67 is then manipulated to bring a row of bottles beneath a row of filling-tubes, and the lever 44, before the frame B is carried upward, is manipulated to cause the valve or pressure blocks E to compress the flexible tubes and prevent a flow of liquid through them from the cask. As soon as the bottles have been placed in position for filling the treadle 28 is released and the metal tubes containing the ball-valves enter the mouths of the bottles, while the flexible funnels 61 cover said mouths and effectually prevent ingress or egress of air. This is accomplished as the frame B descends. Just prior to the frame B arriving at a point of rest the stoppers 59 engage with the tops of the funnel-caps 61 and close the upper ends thereof, as the springs 58 or 66 exert sufficient pressure upon the cut-off sleeves to cause them to come in close contact with the funnels. At this time the sliding frame B is at its farthest downward point. The lever 44 or the equivalent thereof is now manipulated to carry the valve or pressure blocks out of engagement with the flexible tubes D, thus permitting the liquid to flow from the cask into the vessels to be filled. As soon as any one of the bottles has been properly filled the liquid will enter the cage 64 of the vent-tube 63 and float the ball 65 upward, closing said vent, and as the exit of air is stopped the flow of liquid will stop also. Thus bottles of various sizes may be filled without the immediate attention of the operator, as at the moment each bottle has received its due supply of liquid the air-egress is stopped, and consequently the inflowing liquid also. After all the bottles have been filled the frame B may be carried upward again by manipulating the treadle 28, and before carrying the frame upward the valve or pressure blocks E are carried to a position in which they clamp the flexible tubes and stop the flow of liquid therein; but any particular tube may be released from pressure, if found desirable, by pressing the levers 36 of the block, which places the block in a position enabling it to move independently of the others.

The weights 26 are adapted to counterbalance the weight of the frame B, and consequently the operator in moving the frame exerts pressure against the weight of the frame attachments only. After the frame has been lifted upward the rope or chain 76 is drawn forward by the operator, which rotates the shaft 71 sufficiently to carry the table or platform 67 a proper distance backward to bring the next row of bottles immediately beneath the filling-tubes.

Instead of a float-valve in connection with the vent-tubes 63, I preferably connect the vent-tubes directly with the cask, in which event the float-valve and cage are omitted, and a flexible tube 63ª is connected with the metal vent-tube 63 and is carried, preferably, over the anvil-block and beneath a pressure or valve block and into the cask through the bung or in any other approved manner, as shown in Figs. 18 and 19.

The cap-funnel 61 may be made of an elastic material, as heretofore stated; but preferably it is made of metal and provided with a lining 61ª of flexible or elastic material, as shown in Fig. 18; but in any event the funnel-cap is independent of the filling-tube and serves as an advance guide for the tube, as the cap engages with the mouth of a bottle prior to the filling-tube entering the same.

Having thus described my invention, I claim as new and desire to secure by Letters Patent—

1. In a bottle-filling apparatus, the combination, with a compression mechanism, of a flexible filling-tube adapted to enter a cask or like receptacle independent of the apparatus, which tube extends from the cask between the compression mechanism to the receptacle to be filled, and a vent-tube connected with the filling-tube and also adapted to enter the cask, as and for the purpose specified.

2. In a bottling apparatus, the combination, with the anvil-block and flexible tubes passed over the same, of pressure or valve blocks located above the anvil-block, levers connected with said valve-blocks, and a rack-bar receiving said levers, substantially as described.

3. In a bottling apparatus, the combination, with an anvil-block and flexible tubes passed over the same, of pressure or valve blocks located above the flexible tubes, spring-pressed levers fulcrumed in the pressure or valve blocks, a rack-bar receiving said levers, and an actuating mechanism, substantially as described, connected with the rack-bar, as and for the purpose set forth.

4. In a bottling apparatus, the combination, with a counterbalanced sliding frame, an anvil-block secured in the frame, and flexible tubes passed over the anvil-block, of pressure or valve blocks pivoted over the flexible tubes and anvil-block, spring-pressed levers fulcrumed in the pressure or valve blocks, a rack-bar engaging said levers, a shifting-lever connected with the rack-bar, and a hoisting mechanism connected with the frame, as and for the purpose set forth.

5. In a bottling apparatus, the combination, with a sliding frame, an anvil-block secured in the frame, apertured guide-blocks attached to the frame, and flexible tubes passed over the anvil-block through the guide-blocks, of pressure or valve blocks located above the anvil-block and the flexible tubes, a shifting mechanism connected with the pressure or valve blocks, rigid tubes attached to one end of the flexible tubes, brackets held to slide in the guide-blocks, elastic funnels loosely surrounding the rigid tubes and carried by the brackets, spring-pressed stoppers attached to the tubes above the funnel, and vent-tubes connected with the rigid tubes, substantially as shown and described.

6. In a bottling apparatus, the combination, with a movable frame, lifting mechanism connected therewith, an anvil-block located in the said frame, flexible tubes passed over the anvil-block, pressure or valve blocks pivoted above the flexible tubes and anvil-block, and a shifting mechanism connected with the pressure or valve blocks, of guide-blocks attached to the frame constructed in two sections, a body-section and a cap-section, the body-section being provided with apertures and a recess, the recess being adapted to receive the flexible tubes, brackets held to slide in the apertures in the guide-blocks, a cap-funnel carried by the bracket, non-elastic pipes connected with the lower ends of the flexible tubes, which pipes extend downward into the funnels, stoppers located upon the tubes above the funnels, and air-tubes connected with the non-elastic pipes, as and for the purpose set forth.

7. In a bottle-filling apparatus, the combination, with a flexible filling-tube, of a flexible vent-tube connected therewith, the filling-tube and vent-tube both having connection with a cask or like receptacle, and a compression mechanism arranged to act upon both the filling-tube and its vent-tube to close them, substantially as described.

8. In a bottle-filling apparatus, the combination, with a movable frame, of a flexible filling-tube carried by the frame, a flexible vent-tube also carried by the frame, and mechanism carried by the frame for simultaneously compressing the filling and vent tubes, substantially as and for the purpose specified.

9. In a bottle-filling apparatus, the combination, with a bracket and a guide-cap carried by the bracket, of a filling-tube adapted to enter a bottle and loosely located in the cap, a vent-tube secured to one side of the filling-tube, and a sleeve or stopper mounted upon the tube and adapted for engagement with the upper end of the cap, as and for the purpose specified.

10. In a bottle-filling apparatus, the combination, with a cap having a flaring lower end and a filling-tube loosely passed into the cap and adapted to extend below the same, of a stopper located above the cap closing the space between the upper portion of the cap and the filling-tube when said stopper is in engagement with the cap and exerting pressure thereon, substantially as described, whereby the cap acts as a stopper for the vessel to be filled, as set forth.

11. In a bottle-filling apparatus, the combination, with a cap having a flaring lower end and lined upon the inner surface of said flaring end with an elastic material, and a filling-tube loosely passed into the cap through and below the same, of a stop or cut-off located above the cap and exerting pressure thereon, the said cut-off closing the space between the upper portion of the cap and the filling-tube when in engagement with the cap, substantially as and for the purpose specified.

12. In a bottle-filling apparatus, the combination, with a movable bracket and a guide-cap carried by the bracket and having an elastic or flexible inner face, of a filling-tube loosely passed through the cap, a vent-tube secured to one side of the filling-tube and extending above the cap, and a spring-pressed sleeve or stopper mounted upon the filling-tube and adapted to be forced in engagement with the upper end of the guide-cap, as and for the purpose specified.

13. In a bottle-filling apparatus, the combination, with a filling-tube and a movable tube-carrier, of an apertured cap adapted to fit over the mouth of a bottle, said cap being carried by and having a sliding connection with the tube-carrier, substantially as described.

14. In a bottle-filling apparatus, the combination, with a filling-tube and a sliding tube-carrier, of an apertured cap adapted to fit over the mouth of a bottle and having a sliding connection with the carrier and a spring-pressed stopper on the carrier above the cap, substantially as described.

15. In a bottle-filling apparatus, the combination, with a sliding frame and a flexible filling-tube carried by the frame, of an apertured cap adapted to fit over the mouth of a bottle and having a sliding connection with the frame, a spring-pressed stopper carried by the frame above the cap, and means for compressing the filling-tube to cut off the supply of liquid, substantially as described.

16. In a bottle-filling apparatus, the combination, with a sliding frame, of a flexible filling-tube carried by the frame, a flexible vent-tube also carried by the frame, an apertured cap having a sliding connection with the frame, a spring-pressed stopper on the frame above the cap, and means for compressing both the filling and vent tubes, substantially as herein shown and described.

AMALIA M. DONALLY.

Witnesses:
E. M. CLARK,
C. SEDGWICK.